US009672663B2

(12) United States Patent
Sako et al.

(10) Patent No.: US 9,672,663 B2
(45) Date of Patent: Jun. 6, 2017

(54) MANAGEMENT APPARATUS FOR ELECTRICAL APPARATUS, MANAGEMENT METHOD FOR ELECTRICAL APPARATUS, AND MANAGEMENT PROGRAM

(71) Applicant: Sony Corporation, Tokyo (JP)

(72) Inventors: Yoichiro Sako, Tokyo (JP); Taro Tadano, Chiba (JP); Kayoko Tanaka, Tokyo (JP); Miki Shibuya, Tokyo (JP); Kazuyoshi Takemura, Tokyo (JP); Kuniya Hayashi, Tokyo (JP); Isao Soma, Saitama (JP); Takahiro Suzuki, Kanagawa (JP); Kazutoshi Serita, Tokyo (JP); Jiang Wu, Tokyo (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 14/048,763

(22) Filed: Oct. 8, 2013

(65) Prior Publication Data

US 2014/0114610 A1 Apr. 24, 2014

(30) Foreign Application Priority Data

Oct. 24, 2012 (JP) ................................ 2012-234534

(51) Int. Cl.
*G01M 99/00* (2011.01)
*G07C 3/00* (2006.01)

(52) U.S. Cl.
CPC ..................................... *G07C 3/00* (2013.01)

(58) Field of Classification Search
USPC .......................................................... 702/182
See application file for complete search history.

(56) References Cited

U.S. PATENT DOCUMENTS

| | | | | |
|---|---|---|---|---|
| 3,671,860 A * | 6/1972 | Kettler | G01R 19/30 | 324/103 P |
| 2003/0120370 A1* | 6/2003 | Kitayama | H02J 3/008 | 700/100 |

FOREIGN PATENT DOCUMENTS

| | | |
|---|---|---|
| JP | 06-267258 | 9/1994 |
| JP | 2009-159102 | 7/2009 |

OTHER PUBLICATIONS

Josip Lorincz, Measurements and Modelling of Base Station Power Consumption under Real Traffic Loads, Sensors 2012, 12, 4281-4310.*

* cited by examiner

*Primary Examiner* — Tung Lau
(74) *Attorney, Agent, or Firm* — Chip Law Group

(57) ABSTRACT

There is provided a management apparatus for an electrical apparatus, the management apparatus including a communication unit configured to receive conduction state information from an electrical apparatus, a storage unit configured to store reference conduction state information of the electrical apparatus, and a determination unit configured to compare the conduction state information of the electrical apparatus with the reference conduction state information of the electrical apparatus to determine a state of the electrical apparatus.

12 Claims, 5 Drawing Sheets

MANAGEMENT APPARATUS FOR ELECTRICAL APPARATUS, MANAGEMENT METHOD FOR ELECTRICAL APPARATUS, AND MANAGEMENT PROGRAM

CROSS REFERENCES TO RELATED APPLICATIONS

The present application claims priority to Japanese Priority Patent Application JP 2012-234534 filed in the Japan Patent Office on Oct. 24, 2012, the entire content of which is hereby incorporated by reference.

BACKGROUND

The present disclosure relates to a management apparatus for an electrical apparatus, which manages a state of an electrical apparatus, a management method for an electrical apparatus, and a management program.

Families in developed countries use a great number of electrical apparatuses. Generally speaking, if an electrical apparatus breaks down and stops operating, a user usually asks staff in charge of support for the electrical apparatus to repair the electrical apparatus, or purchase a new electrical apparatus. However, it is difficult to predict when an electrical apparatus breaks down, and it is also usually difficult to immediately take measures for the breakdown of the electrical apparatus. Users should endure inconvenience due to the breakdown.

Meanwhile, if a user pays attention, the user sometimes notices a sign of the breakdown of an electrical apparatus. For example, an air conditioner less satisfactorily cools or heats a room, a refrigerator less sufficiently refrigerates food, it takes longer time to dry the laundry, or some noise is generated while an electrical apparatus is operating. When a user notices such a phenomenon, the user feels something is wrong with an electrical apparatus.

However, if a user notices such malfunction of an electrical apparatus, the user does not know to what extent the electrical apparatus is deteriorated. As a result, an electrical apparatus breaks down at last, or a user buys a new electrical apparatus though the user does not actually have to.

The service life of an electrical apparatus has been predicted for many years by measuring a conduction time of the electrical apparatus. For example, JP H06-267258A discloses a service life determination apparatus for consumable parts, which reports to the maker that consumable parts mounted on an electrical apparatus is nearly their last legs, before the consumable parts have reached the service life, and enables the consumable parts to be immediately exchanged when the consumable parts do not work anymore. In JP H06-267258A, a conduction time is accumulated from the time at which the electrical apparatus is turned on to the time at which the electrical apparatus is turned off, and compared with a time relating to the service life of the consumable parts, which has been set in advance. The service life determination apparatus performs control such that a message is output indicating that the consumable parts will reach the time for exchange soon if the accumulated conduction time is shorter than the time relating to the service life and if a time obtained by subtracting the accumulated conduction time from the time relating to the service life falls within a predetermined time. To the contrary, control is performed such that a message is output indicating that the consumable parts want exchanging if the accumulated conduction time is equal to or greater than the time relating to the service life. Accordingly, malfunction caused by the service life of consumable parts can be greatly prevented.

JP 2009-159102A discloses a management system including an electrical apparatus configured to include apparatus identification information for identifying types of apparatuses, and a management apparatus configured to connect to the electrical apparatus via a communication network. In JP 2009-159102A, the management apparatus acquires a time relating to the service life, and the date of manufacture of the connected electrical apparatus, and measures a time (first time of use) elapsed since the electrical apparatus has been manufactured and an accumulated conduction time (second time of use) of the electrical apparatus. If the management apparatus determines that at least one of the first time of use and the second time of use has reached the time relating to the service life, the management apparatus determines that the electrical apparatus is nearly on its last legs or has reached the service life. In addition, the management apparatus is configured to report to a display device, an electrical device, or a mobile phone that the electrical apparatus is nearly on its last legs or has reached the service life. Accordingly, a user can be notified as the determination result that, for example, an electrical apparatus is nearly on its last legs or has reached the service life, while loads or costs of the electrical apparatus can also be suppressed.

SUMMARY

In both of JP H06-267258A and JP 2009-159102A, the service life of consumable parts or an electrical apparatus is determined by measuring a conduction time of the electrical apparatus. In JP 2009-159102A, the service life of an electrical apparatus and necessity for exchanging parts are further reported. However, there are variations in a process of manufacturing electrical apparatuses and it is also different how the electrical apparatuses are used. Consequently, the service lives of the electrical apparatuses are also different. Thus, if the service life is predicted from an accumulated conduction time, it is still difficult to accurately predict the service life. Even if it is determined that an electrical apparatus has nearly reached the service life, it is sometimes unnecessary to immediately buy a new electrical apparatus. In this way, a method for predicting the service life only from an accumulated conduction time does not provide a sufficient reason to determine whether to ask an electrical apparatus to be repaired and whether to buy a new electrical apparatus.

Thus, the present disclosure proposes a management apparatus for an electrical apparatus, which allows a present state of an electrical apparatus to be accurately determined, a management method for an electrical apparatus, and a management program.

According to an embodiment of the present disclosure, there is provided a management apparatus for an electrical apparatus, the management apparatus including a communication unit configured to receive conduction state information from an electrical apparatus, a storage unit configured to store reference conduction state information of the electrical apparatus, and a determination unit configured to compare the conduction state information of the electrical apparatus with the reference conduction state information of the electrical apparatus to determine a state of the electrical apparatus.

According to another embodiment of the present disclosure, there is provided a management method for an electrical apparatus, the management method including receiving conduction state information from an electrical apparatus through communication, and comparing, by a determination unit, the conduction state information of the electrical apparatus with reference conduction state information of the electrical apparatus stored in a storage unit to determine a state of the electrical apparatus.

According to still another embodiment of the present disclosure, there is provided a management program for causing a computer to execute a management method for an electrical apparatus, the method including receiving conduction state information from an electrical apparatus through communication, and comparing, by a determination unit, the conduction state information of the electrical apparatus with reference conduction state information of the electrical apparatus stored in a storage unit to determine a state of the electrical apparatus.

According to embodiments of the present disclosure, it is possible to accurately determine a state of an electrical apparatus. It is also possible in accordance with the determination result to take measures such as asking the electrical apparatus to be repaired and buying a new electrical apparatus.

Additional features and advantages are described herein, and will be apparent from the following Detailed Description and the figures.

DETAILED DESCRIPTION

Figure 1:
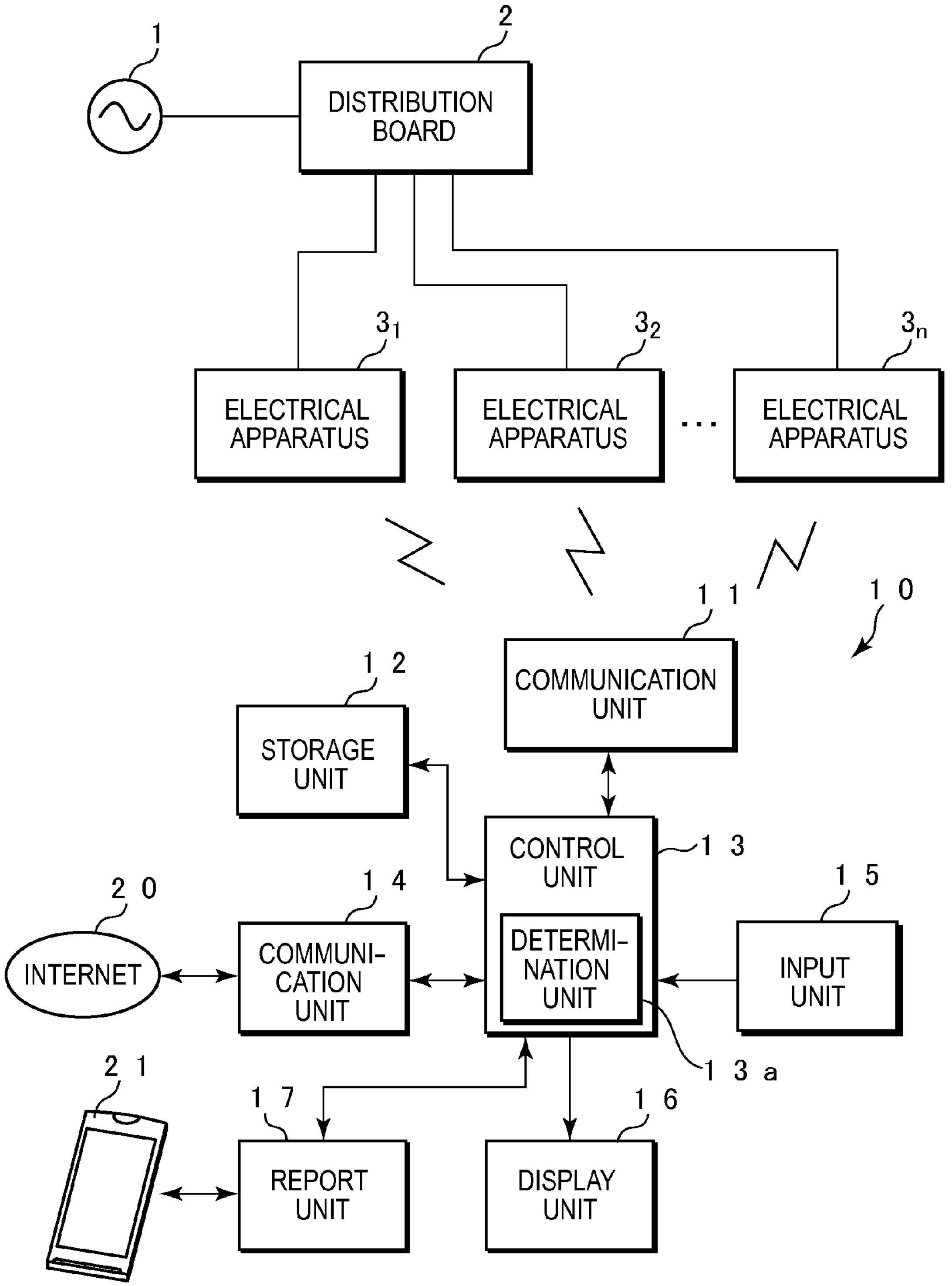
FIG. 1 is a block diagram illustrating an example of a management apparatus for an electrical apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. Embodiment of Present Disclosure

Configuration of Management Apparatus

A configuration of a management apparatus for an electrical apparatus according to an embodiment of the present disclosure will be described. FIG. 1 illustrates a management system for an electrical apparatus installed at home.

Alternating current power is supplied to a house from a system power supply 1 through a distribution network. A power line is introduced from an outdoor distribution line into a building through a service wire and wiring at a service entrance, and connected to a distribution board 2. A watt-hour meter (meter), which is not shown, is attached to the wiring at the service entrance.

The distribution board 2 is configured to have a service breaker, an earth leakage circuit breaker, and a branch breaker connected thereto from the side of the wiring at the service entrance in order of mention. The service breaker automatically stops an electric current if more electric currents than electric currents defined by a contraction with an electric power company flows. The earth leakage circuit breaker senses electric leakage of indoor wiring and an electrical apparatus to automatically interrupt an electric current. The branch breaker is attached to a branch circuit that transmits an electric current from the distribution board 2 to a room. The branch breaker automatically interrupts an electric current when an overcurrent flows, that is, an electrical apparatus and wiring break down and short-circuit, and when too much electricity is used (overload).

Multiple electrical apparatuses $\mathbf{3}_1$, $\mathbf{3}_2$, . . . , $\mathbf{3}_n$ (which are simply referred to as (an) electrical apparatus(es) 3 if the multiple electrical apparatuses do not have to be individually distinguished in particular) are connected to indoor wiring from a branch breaker of the distribution board 2. The electrical apparatus 3 is, for example, an air conditioner, a refrigerator, an electrical washing machine, a tumble dryer, a television, or a personal computer.

The electrical apparatuses 3 each have apparatus identification information. The electrical apparatus 3 further have a function of measuring a conduction state of the electrical apparatus 3, and a communication function. The electrical apparatus 3 can transmit the apparatus identification information and the measured conduction state information to a management apparatus 10, which will described below. The conduction state information means information regarding an electric current and power supplied while the electrical apparatus is operating. For example, the conduction state information means consumed power at the time of measurement, a peak value of a consumed electric current, a mean value of the consumed electric current per predetermined time, and variance of the consumed electric current per predetermined time. Such values of an electric current are further different in each operation mode of an electrical apparatus. Thus, the conduction state information also includes identification information indicating operation mode information. A conduction state will be referred to as a conduction amount as necessary.

The electrical apparatus 3 has a check button disposed thereon as an input device that a user operates. The check button does not necessarily have to be disposed on the body of the electrical apparatus 3. For example, a button of a remote controller may be assigned as the check button.

The electrical apparatus 3 may also be configured to be connected to a smart tap (smart outlet) and an authentication type outlet. A smart tap and an authentication type outlet can measure an electric current and voltage for each connected electrical apparatus 3. In such an embodiment, a smart tap and an authentication type outlet allow conduction state information of the connected electrical apparatus 3 to be measured, and allow communication to be performed.

The management apparatus 10 includes a communication unit 11, a storage unit 12, a control unit 13, a communication unit 14, an input unit 15, a display unit 16, and a report unit 17. Specifically speaking, the management apparatus 10 is a home gateway (home server).

The communication unit 11 receives apparatus identification information of the electrical apparatus 3 and conduction amount information per apparatus. As described above, conduction amount information includes operation mode information. Communication between the electrical apparatus 3, a smart tap, or an authentication type outlet and the communication unit 11 is preferably performed wirelessly.

A network in wireless communication standards such as a wireless local area network (LAN), Bluetooth (registered trademark), and ZigBee can be used as a scheme of wireless communication. Bluetooth (registered trademark) is used for multimedia communication, and allows communication through a one-to-many connection. ZigBee uses a physical layer defined by Institute of Electrical and Electronics Engineers (IEEE) 802.15.4. IEEE 802.15.4 is a name for a near field communication standard called a personal area network (PAN) or a wireless (W)PAN.

Additionally, a wired communication channel may be used between the electrical apparatus 3, a smart tap, or an authentication outlet and the communication unit 11. A wired communication channel is, for example, power line communications (PLC) and a home network.

The storage unit 12 stores reference conduction amount information per electrical apparatus 3. Reference conduction amount information changes in operation modes of the electrical apparatus. Reference conduction amount information according to an operation mode is therefore stored. The storage unit 12 is, for example, non-volatile memory such as flash memory. For example, it is an example for acquiring reference conduction amount information to use the control unit 13 to acquire reference conduction amount information that has been stored in each electrical apparatus 3 in advance, and to acquire reference conduction amount information from a site on a network, as described below.

The control unit 13 is connected to each unit of the management apparatus 10, and controls each unit to operate the management apparatus 10. The control unit 13 includes a central processing unit (CPU) that is not shown but performs various processes and a control process, storage units (such as read only memory (ROM) and random access memory (RAM)) that are not shown but store a database, a program, and the like, and a clock (timer) that is not shown. A management program for causing a computer to execute a management method in the management apparatus 10 is stored in the storage unit that is not shown.

The control unit 13 includes a determination unit 13*a*. Conduction amount information and an accumulated conduction amount of the electrical apparatus 3 are supplied to the determination unit 13*a*. Reference conduction amount information is further supplied to the determination unit 13*a* from the storage unit 12. The determination unit 13*a* compares the conduction amount information of the electrical apparatus 3 with the reference conduction amount information of the electrical apparatus 3, and further combines the accumulated conduction amount therewith as necessary to determine a state of the electrical apparatus 3. The reference conduction amount information is conduction amount information with the time of shipment of the electrical apparatus regarded as a reference. The reference conduction amount information may be set on the basis of a time point a predetermined time after the electrical apparatus has been used.

Additionally, the management apparatus 10 may be capable of communicating with the electrical apparatus 3 via the communication unit 11 on the basis of a result obtained by the determination unit 13*a* determining a state of the electrical apparatus 3, thereby controlling the operation of the electrical apparatus 3. The management apparatus 3 transmits control signals to the electrical apparatus 3, for example, through wireless communication to control the operation of the electrical apparatus 3. For example, if the determination result shows that the electrical apparatus 3 is abnormal, the management apparatus 10 transmits control signals to the electrical apparatus 3, which compulsorily stop the operation of the electrical apparatus 3.

The communication unit 14 can connect to an external network such as the Internet 20. The management apparatus 10 can acquire various information of the electrical apparatus 3 such as reference conduction amount information from a site of the maker of the electrical apparatus 3 or a site relating to the maker on the Internet 20 via the communication unit 14. The apparatus identification information received from the electrical apparatus 3 by the management apparatus 10 via the Internet 20 is transmitted to a site for information provision such as a site of the maker of the electrical apparatus 3. The communication unit 14 receives, from the site, reference conduction amount information according to an operation mode of the electrical apparatus indicated in the apparatus identification information. The reference conduction amount information acquired in this way is stored in the storage unit 12 of the management apparatus 10. Additionally, a determination process of the determination unit 13*a* may be performed on a site of the maker of the electrical apparatus 3 or a site relating to the maker on the Internet 20. In that case, the conduction amount information received from the electrical apparatus 3 by the management apparatus 10 is transmitted to the site.

The input unit 15 is a user interface such as an operation key, an operation button, and a mouse that are each configured to receive an operation of a user. The display unit 16 displays various types of information such as a determination result obtained by determining the electrical apparatus 3. The display unit 16 is, for example, a liquid crystal panel or display. For example, a touch panel obtained by integrating the input unit 15 with the display unit 16 may be used. An operation input of a user is supplied to the control unit 13 from the input unit 15 through an input/output interface. Necessary information is supplied to the display unit 16 and displayed.

The report unit 17 reports a determination result of a state of the electrical apparatus 3 to various information communication apparatuses 21 outside the management apparatus 10. The report unit 17 is, for example, a mobile phone, a smartphone, a mobile terminal, and a computer. Additionally, a determination result may also be reported to the electrical apparatus 3 via the communication unit 11.

Management Method of Management Apparatus (First Example)

Figure 2:
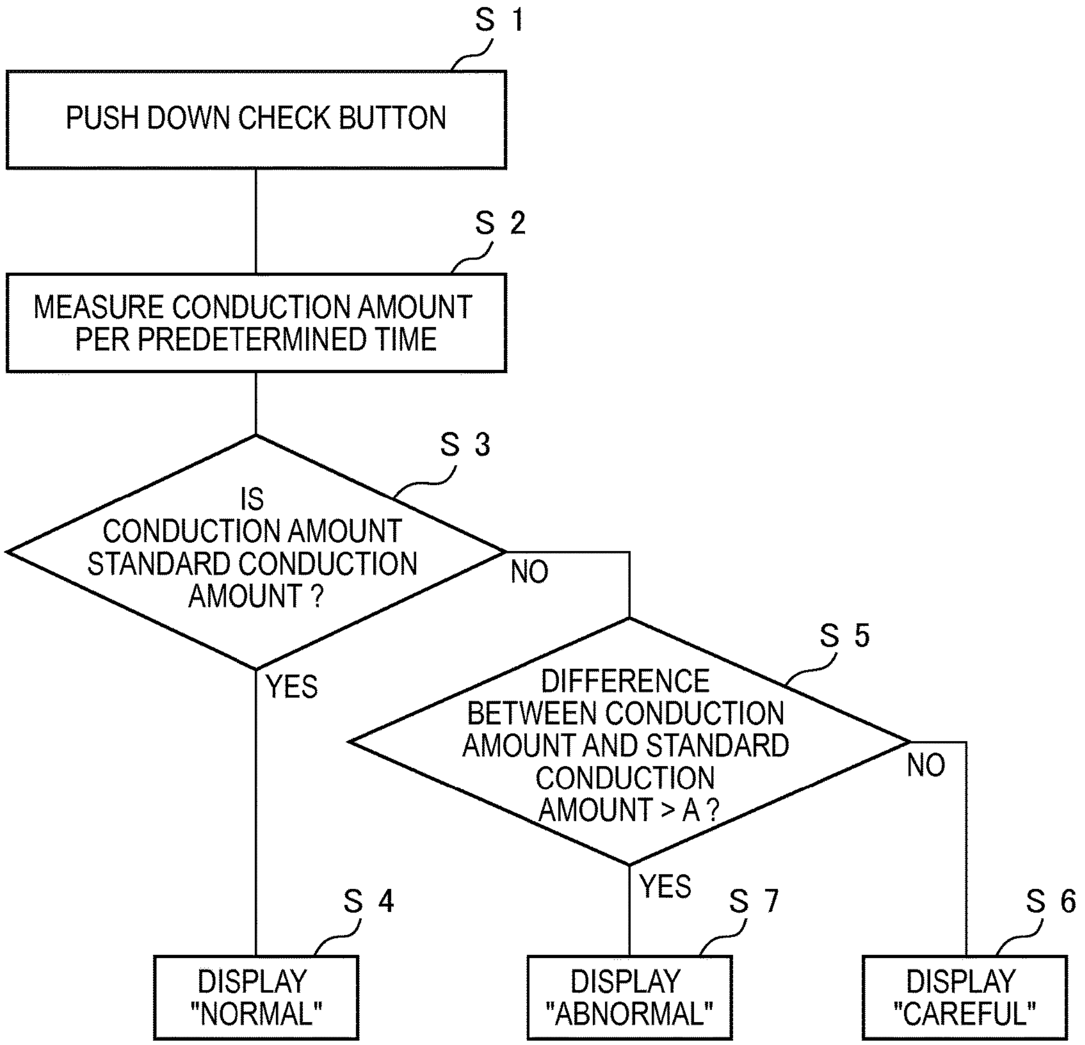
FIG. 2 is a flowchart for describing a first example of a management method for an electrical apparatus according to an embodiment of the present disclosure.

With reference to a flowchart illustrated in FIG. 2, a first example of a management method to be performed by the management apparatus 10 will be described. The flowchart shows a flow of processes performed under control of the control unit 13 of the management apparatus 10.

Step S1: A check button is pushed down. The check button is disposed on the electrical apparatus 3. Additionally, the check button may also be disposed on the management apparatus 10. For example, the input unit 15 may be used to designate the electrical apparatus 3 that is a measurement target. Furthermore, one of external various information communication apparatuses 21 may be used to start measurement via the management apparatus 10. A process of determining a state of the apparatus may be automatically performed at predetermined intervals, each of which is obtained by accumulating the operation time.

Step S2: A conduction amount per predetermined time is measured. The predetermined time is appropriately set in accordance with the target electrical apparatus such that state information necessary for determining the state can be acquired. A conduction amount of the electrical apparatus 3 is measured by the electrical apparatus 3, a smart tap, or an authentication type outlet. The measured conduction amount is provided to the determination unit 13*a* via the communication unit 11 along with apparatus identification information of the electrical apparatus 3. Additionally, the conduction amount changes in accordance with an operation mode of the electrical apparatus 3 such as a powerful operation and a less powerful operation. The determination unit 13*a* is supplied with the conduction amount information including operation mode information that indicates the operation mode.

Step S3: It is determined whether the conduction amount is substantially equal to a standard conduction amount. A standard conduction amount for the electrical apparatus 3 is provided to the determination unit 13*a* from the storage unit 12 on the basis of the apparatus identification information. The standard conduction amount means a standard conduction amount that is defined for each operation mode of an electrical apparatus. It is determined in the determination unit 13*a* whether the conduction amount is substantially equal to a standard conduction amount. For example, a difference between the measured conduction amount and a standard conduction amount is calculated, and the difference is compared with a threshold value.

Step S4: If it is determined that the conduction amount is substantially equal to the standard conduction amount (step S3: YES), it is determined that the electrical apparatus is in a normal state, and the display unit 16 displays “normal.” “Normal” may also be displayed on a display unit of the body of the electrical apparatus 3, which is not shown, a display unit of a remote controller, which is not shown, or the external various information communication apparatuses 21.

Step S5: If it is determined that the conduction amount is not substantially equal to the standard conduction amount (step S3: NO), it is determined whether a difference (such as an absolute value) between the conduction amount and the standard conduction amount exceeds a threshold value A.

Step S6: If it is determined that the difference between the conduction amount and the standard conduction amount is equal to or less than the value A (step S5: NO), it is determined that the electrical apparatus is in a state in which the electrical apparatus is treated with care. The display unit 16 displays “careful (with care).” “Careful (with care)” may also be displayed on the display unit of the body of the electrical apparatus 3, which is not shown, the display unit of the remote controller, which is not shown, or the external various information communication apparatuses 21. Furthermore, a speaker of the report unit 17, which is not shown, may also be configured to output warning sounds. It is meant in step S6 that though the electrical apparatus is not in an “abnormal” state, the electrical apparatus is not also in a satisfactory state so that the electrical apparatus has to be treated with care. For example, a user explains the state to the manufacturer in charge of support, and asks the electrical apparatus to be repaired as necessary.

Step S7: If it is determined that the difference between the conduction amount and the standard conduction amount exceeds the threshold value A (step S5: YES), it is determined that the electrical apparatus is in an abnormal state, and the display unit 16 displays “abnormal.” “Abnormal” may also be displayed on the display unit of the body of the electrical apparatus 3, which is not shown, the display unit of the remote controller, which is not shown, or the external various information communication apparatuses 21. Furthermore, the speaker of the report unit 17, which is not shown, may also be configured to output warning sounds. A user takes measures such as explaining the state to the manufacturer in charge of support, asking the electrical apparatus to be repaired, and buying a new electrical apparatus.

The above-describe methods allow a present state of the electrical apparatus 3 to be instantly grasped. A user can take appropriate measures in accordance with the determination result. It is also possible to transmit the measurement result and the determination result to the manufacturer. Such results assist the manufacturer in dealing therewith.

Management Method of Management Apparatus (Second Example)

Figure 3:
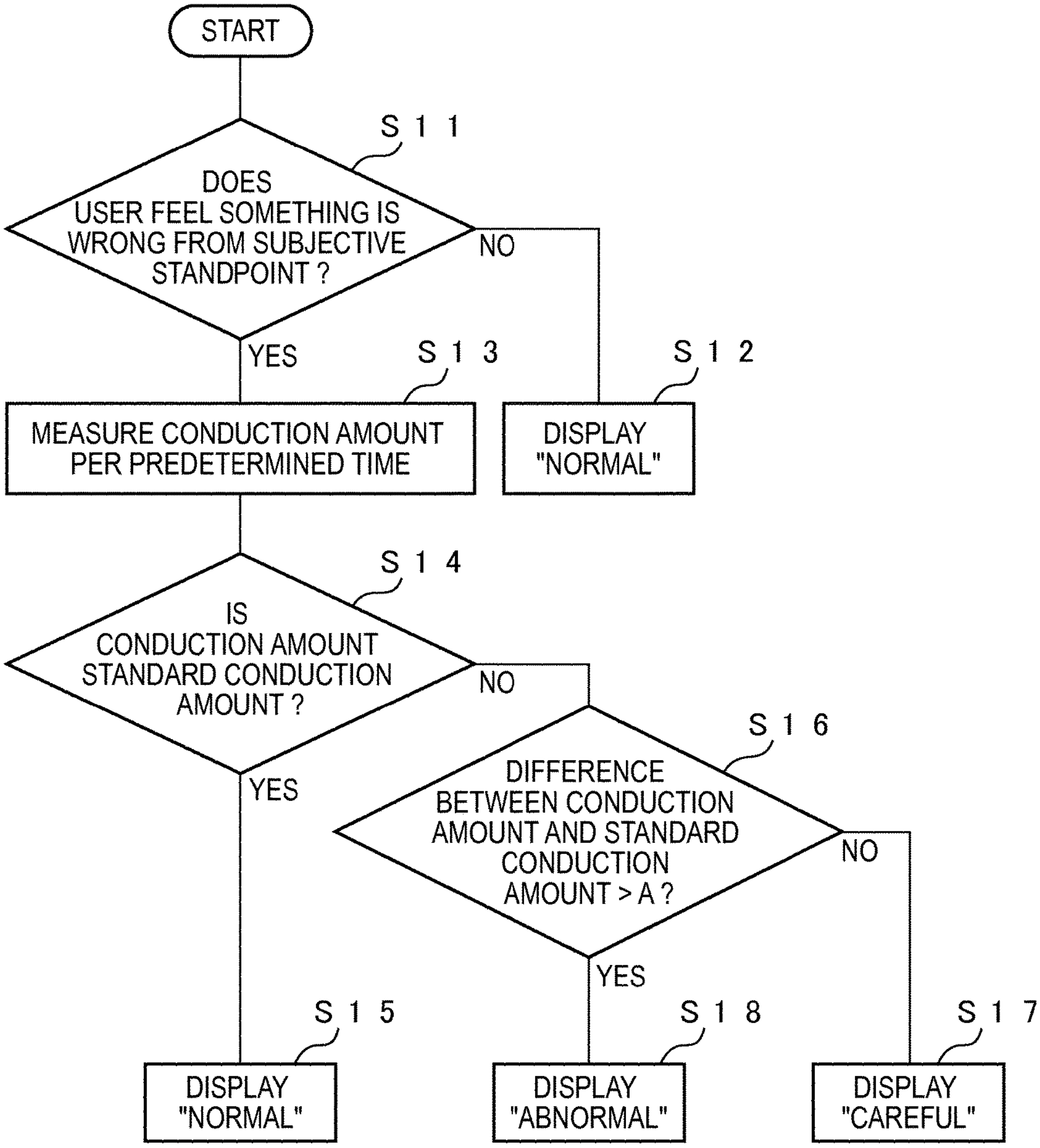
FIG. 3 is a flowchart for describing a second example of a management method for an electrical apparatus according to an embodiment of the present disclosure.

With reference to a flowchart illustrated in FIG. 3, a second management method to be performed by the management apparatus 10 will be described. The second management method takes an opinion of a user into consideration.

Step S11: It is determined whether a user feels something is wrong from a subjective standpoint when using an electrical apparatus.

Step S12: If it is determined that the user does not feel something is wrong from a subjective standpoint (step S11: NO), it is determined that the electrical apparatus is in a normal state, and the display unit 16 displays “normal.” “Normal” may also be displayed on the display unit of the body of the electrical apparatus 3, which is not shown, the display unit of the remote controller, which is not shown, or the external various information communication apparatuses 21. Additionally, if it is determined that the electrical apparatus is in a normal state, nothing may be displayed and the process may be returned to step S11.

Step S13: If it is determined that the user feels something is wrong from a subjective standpoint (step S11: YES), a conduction amount per predetermined time is measured. Additionally, step S13 corresponds to step S2 in the above-described first management method, and step S13 to step S18 are the same processes as step S2 to step S7 illustrated in FIG. 2.

Step S14: It is determined whether the conduction amount is substantially equal to a standard conduction amount.

Step S15: If it is determined that the conduction amount is substantially equal to the standard conduction amount (step S14: YES), it is determined that the electrical apparatus is in a normal state, and the display unit 16 displays “normal.”

Step S16: If it is determined that the conduction amount is not substantially equal to the standard conduction amount (step S14: NO), it is determined whether a difference (such as an absolute value) between the conduction amount and the standard conduction amount exceeds a threshold value A.

Step S17: If it is determined that the difference between the conduction amount and the standard conduction amount is equal to or less than the value A (step S16: NO), the display unit 16 displays “careful (with care).”

Step S18: If it is determined that the difference between the conduction amount and the standard conduction amount exceeds the threshold value A (step S16: YES), it is determined that the electrical apparatus is in an abnormal state, and the display unit 16 displays “abnormal.”

In the above-described second management method, when a user, who actually uses an electrical apparatus, wonders that the electrical apparatus is not in a satisfactory state, the user can immediately determine a state of the electrical apparatus. Thus, without contacting the maker in charge of support, the user can know a state of the electrical apparatus and can use the electrical apparatus without worry.

Management Method of Management Apparatus (Third Example)

Figure 4:
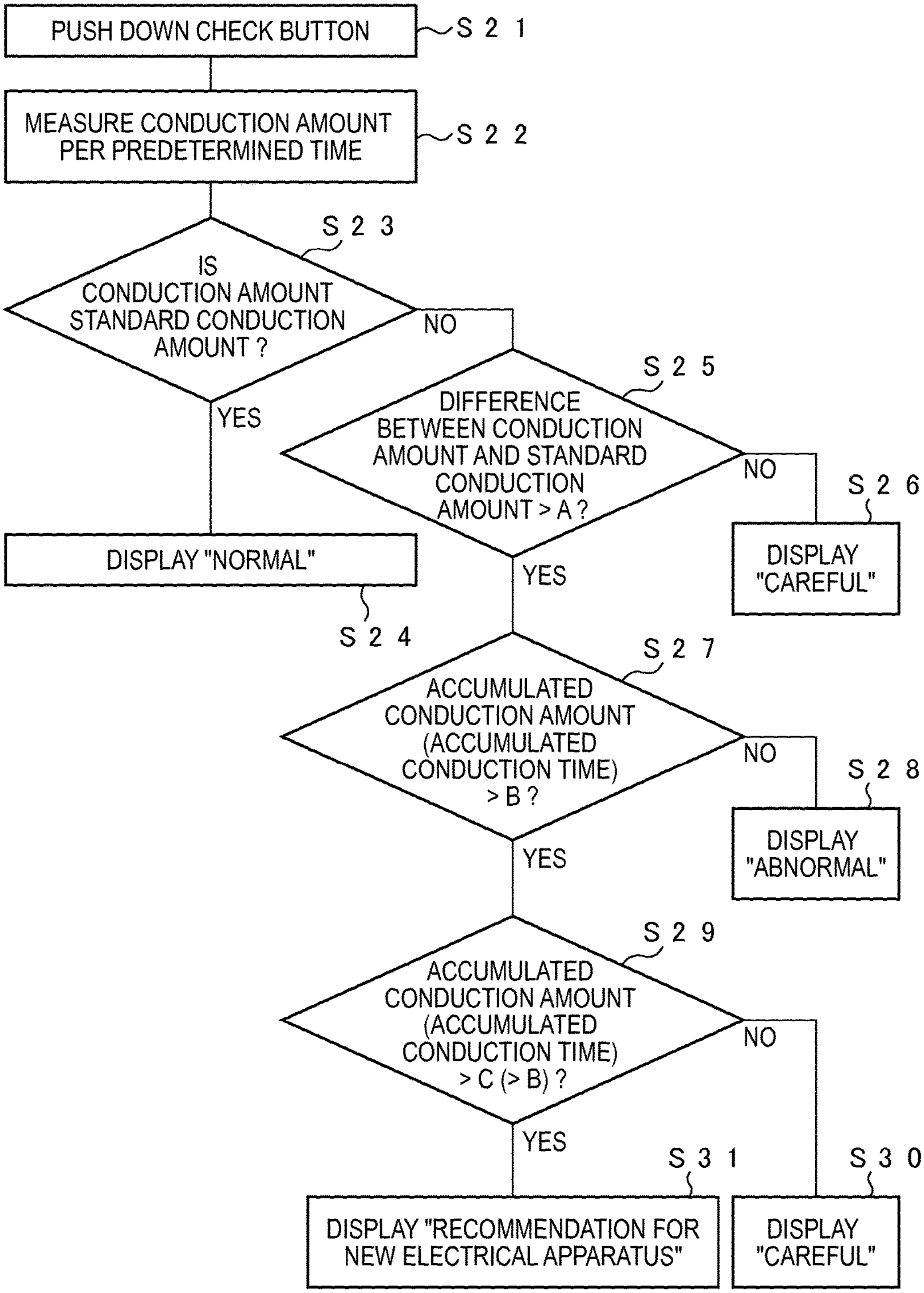
FIG. 4 is a flowchart for describing a third example of a management method for an electrical apparatus according to an embodiment of the present disclosure.

With reference to a flowchart illustrated in FIG. 4, a third example of a management method to be performed by the management apparatus 10 will be described. An accumulated conduction amount is also used for determination in the third example.

Step S21: A check button is pushed down.

Step S22: A conduction amount per predetermined time is measured.

Step S23: It is determined whether the conduction amount is substantially equal to a standard conduction amount.

Step S24: If it is determined that the conduction amount is substantially equal to the standard conduction amount (step S23: YES), it is determined that an electrical apparatus is in a normal state, and the display unit 16 displays "normal."

Step S25: If it is determined that the conduction amount is not substantially equal to the standard conduction amount (step S23: NO), it is determined whether a difference (such as an absolute value) between the conduction amount and the standard conduction amount exceeds a threshold value A.

Step S26: If it is determined that the difference between the conduction amount and the standard conduction amount is equal to or less than the value A (step S25: NO), the display unit 16 displays "careful (with care)."

Step S27: If it is determined that the difference between the conduction amount and the standard conduction amount exceeds A (step S25: YES), it is determined whether an accumulated conduction amount exceeds B. An accumulated conduction time may be used instead of the accumulated conduction amount. Both of the accumulated conduction amount and the accumulated conduction time may also be used.

Step S28: If it is determined that the accumulated conduction amount is equal to or less than B (step S27: NO), it is determined that the electrical apparatus is in an abnormal state, and the display unit 16 displays "abnormal."

Step S29: if it is determined that the accumulated conduction amount exceeds B (step S27: YES), it is determined whether the accumulated conduction amount exceeds C. Additionally, C is greater than B. The accumulated conduction time may be used instead of the accumulated conduction amount. Both of the accumulated conduction amount and the accumulated conduction time may also be used.

Step S30: If it is determined that the accumulated conduction amount is equal to or less than C (step S29: NO), the display unit 16 displays "careful."

Step S31: If it is determined that the accumulated conduction amount exceeds C (step S29: YES), the display unit 16 displays "recommendation for new electrical apparatus."

Management Method of Management Apparatus (Fourth Example)

Figure 5:
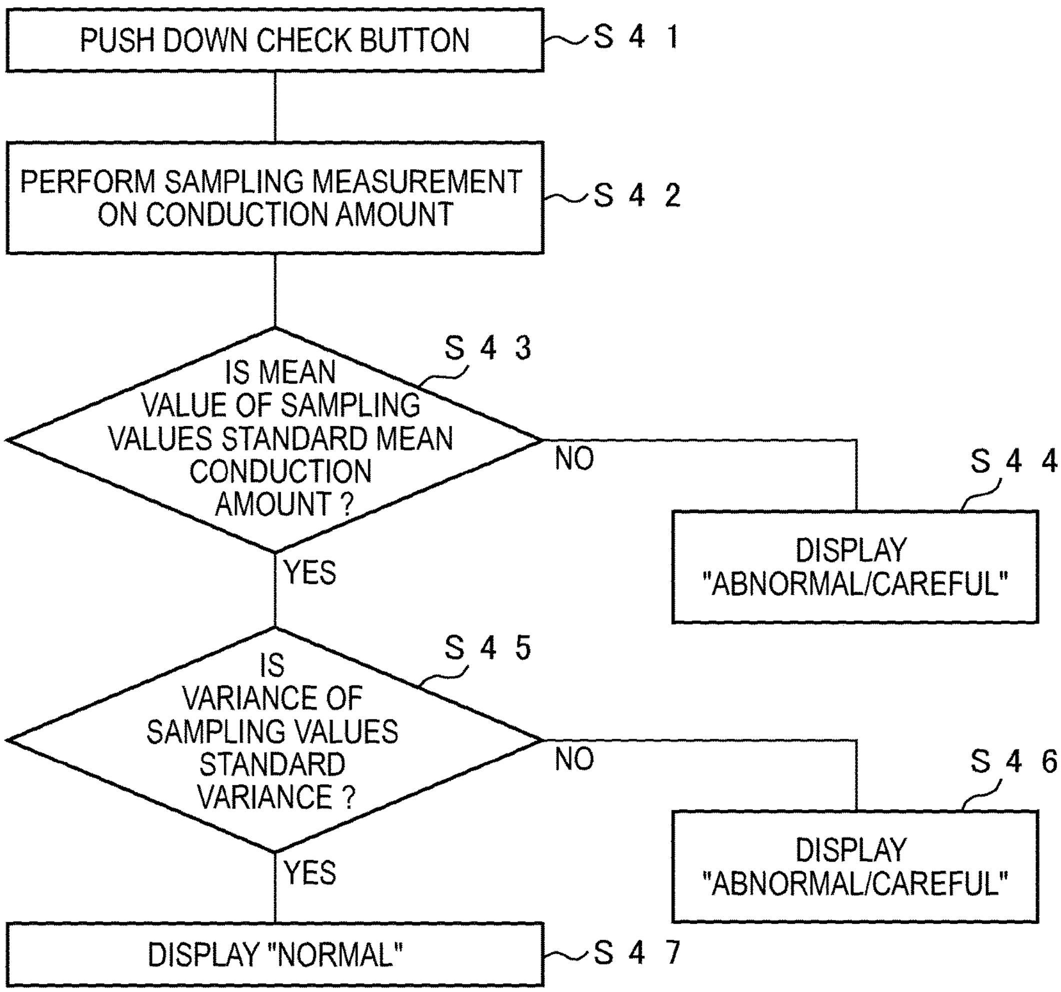
FIG. 5 is a flowchart for describing a fourth example of a management method for an electrical apparatus according to an embodiment of the present disclosure.

With reference to a flowchart illustrated in FIG. 5, a fourth example of a management method to be performed by the management apparatus 10 will be described. Fluctuation in a conduction amount is measured as a conduction state in the fourth example. Additionally, "abnormal" display and "careful" display are not herein distinguished for convenience of explanation. However, in the same way as the methods in the first to third examples, the two states are actually distinguished.

Step S41: A check button is pushed down.

Step S42: Sampling measurement is performed on a conduction amount. The sampling measurement means a method for measuring fluctuation in the conduction amount of the electrical apparatus 3 per predetermined time (periodically).

Step S43: It is determined whether a mean value of sampling values is substantially equal to a standard conduction amount.

Step S44: If it is determined that the mean value of the sampling values is not substantially equal to the standard conduction amount (step S43: NO), it is determined that the state of the electrical apparatus is one of an "abnormal" state and a "careful" state.

Step S45: If it is determined that the mean value of the sampling values is substantially equal to the standard conduction amount (step S43: YES), it is determined whether variance of the sampling values is substantially equal to standard variance.

Step S46: If it is determined that the variance of the sampling values is not substantially equal to the standard variance (step S45: NO), it is determined that the state of the electrical apparatus is one of an "abnormal" state and a "careful" state.

Step S47: If it is determined that the variance of the sampling values is substantially equal to the standard variance (step S45: YES), it is determined that the electrical apparatus is in a "normal" state.

Additionally, the present application may also be configured as below.

(1) A management apparatus for an electrical apparatus, the management apparatus including:

a communication unit configured to receive conduction state information from an electrical apparatus;

a storage unit configured to store reference conduction state information of the electrical apparatus; and a determination unit configured to compare the conduction state information of the electrical apparatus with the reference conduction state information of the electrical apparatus to determine a state of the electrical apparatus.

(2) The management apparatus for an electrical apparatus according to (1), wherein, when the conduction state information is beyond a range of the reference conduction state information, the determination unit determines that the electrical apparatus is in a first state, and when the conduction state information is beyond the range of the reference conduction state information and a range of the first state, the determination unit determines that the electrical apparatus is in a second state.

(3) The management apparatus for an electrical apparatus according to (1) or (2), wherein the storage unit stores a first threshold value and a second threshold value, the second threshold value being different from the first threshold value, and wherein, when a difference between the conduction state information and the reference conduction state information is equal to or more than the first threshold value, the determination unit determines that the electrical apparatus is in a first state, and when the difference between the conduction state information and the reference conduction state information is equal to or more than the second threshold value, the determination unit determines that the electrical apparatus is in a second state.

(4) The management apparatus for an electrical apparatus according to (2) or (3), wherein the first state means a state in which a care has to be taken, and the second state means an abnormal state.

(5) The management apparatus for an electrical apparatus according to (1), wherein the storage unit stores accumulated conduction state information obtained by accumulating the conduction state information, and wherein the determination unit combines the conduction state information with the accumulated conduction state information to determine the state of the electrical apparatus.

(6) The management apparatus for an electrical apparatus according to any one of (1) to (5), wherein a user operates an input device to start determination of the state of the electrical apparatus, the input device being installed relating to the electrical apparatus.

(7) The management apparatus for an electrical apparatus according to any one of (1) to (6), wherein the reference conduction state information is information with a time of shipment of the electrical apparatus regarded as a reference.

(8) The management apparatus for an electrical apparatus according to any one of (1) to (7), wherein the storage unit is included in a site of a maker of the electrical apparatus or a site relating to the maker on a network.

(9) The management apparatus for an electrical apparatus according to any one of (1) to (7), wherein the determination unit is included in a site of a maker of the electrical apparatus or a site relating to the maker on a network.

(10) The management apparatus for an electrical apparatus according to any one of (1) to (10), further including:

a report unit configured to report a result obtained by determining the state.

(11) A management method for an electrical apparatus, the management method including:

receiving conduction state information from an electrical apparatus through communication; and comparing, by a determination unit, the conduction state information of the electrical apparatus with reference conduction state information of the electrical apparatus stored in a storage unit to determine a state of the electrical apparatus.

(12) A management program for causing a computer to execute a management method for an electrical apparatus, the method including receiving conduction state information from an electrical apparatus through communication; and comparing, by a determination unit, the conduction state information of the electrical apparatus with reference conduction state information of the electrical apparatus stored in a storage unit to determine a state of the electrical apparatus.

2. Modified Examples

Although the preferred embodiments of the present disclosure have been described in detail with reference to the appended drawings, the present disclosure is not limited thereto. For example, the configurations, the methods, the steps, the shapes, the materials, the numeral values, and the like mentioned in the above-described embodiments are just examples. Different configurations, methods, steps, shapes, materials, numeral values, and the like may also be used as necessary.

The configurations, the methods, the steps, the shapes, the materials, the numeral values, and the like mentioned in the above-described embodiments can also be combined therewith insofar as they are within the technical scope of the present disclosure. For example, a management method may be used that is obtained by combining the above-described first to fourth management methods with each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A management apparatus, comprising:

a communication unit configured to receive conduction state information from one or more electrical devices, wherein each of the one or more electrical devices are coupled to a distribution board through a branch breaker;

a storage unit configured to store reference conduction state information for each of the one or more electrical devices; and a determination unit configured to compare the conduction state information of each of the one or more electrical devices with one of the reference conduction state information that corresponds to each of the one or more electrical devices to determine a state of each of the one or more electrical devices, wherein for each of the one or more electrical devices:

the conduction state information comprises a conduction amount;

the reference conduction state information comprises a standard conduction amount that is based on an operation mode of each of the one or more electrical devices, wherein the standard conduction amount is provided based on device identification information that corresponds to each of the one or more electrical devices; and the comparison comprises comparison of the conduction amount to the standard conduction amount.

2. The management apparatus according to claim 1, wherein, in an event the conduction state information is beyond a range of the reference conduction state information, the determination unit is further configured to determine that each of the one or more electrical devices is in a first state, and in an event the conduction state information is beyond the range of the reference conduction state information and a range of the first state, the determination unit is further configured to determine that each of the one or more electrical devices is in a second state.

3. The management apparatus according to claim 1, wherein the storage unit is further configured to store a first threshold value and a second threshold value, the second threshold value is different from the first threshold value, and wherein, in an event a difference between the conduction state information and the reference conduction state information is equal to or more than the first threshold value, the determination unit is further configured to determine that each of the one or more electrical devices is in a first state, and in an event the difference between the conduction state information and the reference conduction state information is equal to or more than the second threshold value, the determination unit is further configured to determine that each of the one or more electrical devices is in a second state.

4. The management apparatus according to claim 3, further comprising:

a display unit configured to display a message that indicates the first state or the second state.

5. The management apparatus according to claim 1, wherein the storage unit is further configured to store accumulated conduction state information obtained by accumulation of the conduction state information, and wherein the determination unit is further configured to combine the conduction state information with the accumulated conduction state information to determine the state of each of the one or more electrical devices.

6. The management apparatus according to claim 1, wherein an input device is configured to receive a user input to start determination of the state of each of the one or more electrical devices, wherein the input device is installed in relation to each of the one or more electrical devices.

7. The management apparatus according to claim 1, wherein the reference conduction state information, of one of the one or more electrical devices, is information with a time of shipment of the one of the one or more electrical devices regarded as a reference.

8. The management apparatus according to claim 1, wherein the storage unit is included in a site of a maker of the one or more electrical devices or a site in association with the maker on a network.

9. The management apparatus according to claim 1, wherein the determination unit is included in a site of a maker of the one or more electrical devices or a site in association with the maker on a network.

10. The management apparatus according to claim 1, further comprising:

a report unit configured to report a result obtained by the determined state of each of the one or more electrical devices.

11. A management method, comprising:

receiving conduction state information from one or more electrical devices through communication, wherein each of the one or more electrical devices are coupled to a distribution board through a branch breaker;

determining, by a determination unit, a present state of each of the one or more electrical devices, by comparing the conduction state information of each of the one or more electrical devices with a corresponding one of reference conduction state information of each of the one or more electrical devices stored in a storage unit; and displaying, by a display unit, a message indicating the present state of each of the one or more electrical devices based on the determination result, wherein for each of the one or more electrical devices:

the conduction state information comprises a conduction amount;

the reference conduction state information comprises a standard conduction amount that is based on an operation mode of each of the one or more electrical devices, wherein the standard conduction amount is provided based on corresponding device identification information for each of the one or more electrical devices; and the comparison comprises comparing the conduction amount to the standard conduction amount.

12. A non-transitory computer-readable recording medium having stored thereon, a set of computer-executable instructions for causing a computer to perform the operations, comprising:

receiving conduction state information from one or more electrical devices through communication, wherein each of the one or more electrical devices are coupled to a distribution board through a branch breaker;

determining, by a determination unit, a present state of each of the one or more electrical devices by comparing the conduction state information of each of the one or more electrical devices with a corresponding one of the reference conduction state information of each of the one or more electrical devices stored in a storage unit; and displaying, by a display unit, a message indicating the present state of each of the one or more electrical devices based on the determination result, wherein for each of the one or more electrical devices:

the conduction state information comprises a conduction amount;

the reference conduction state information comprises a standard conduction amount that is based on an operation mode of each of the one or more electrical devices, wherein the standard conduction amount is provided based on corresponding device identification information for each of the one or more electrical devices; and the comparison comprises comparing the conduction amount to the standard conduction amount.

* * * * *